United States Patent [19]

Kitagawa et al.

[11] Patent Number: 4,459,627
[45] Date of Patent: Jul. 10, 1984

[54] METHOD OF PRODUCING A TAPE GUIDE DEVICE OF A ROTARY HEAD TYPE VIDEO TAPE RECORDER AND THE PRODUCT THEREOF

[75] Inventors: Haruhiko Kitagawa; Hiroyuki Ito, both of Okayama; Takashi Ichiyanagi, Hirakata; Kiyokazu Imanishi, Higashiosaka, all of Japan

[73] Assignee: Matsushita Electric Industrial Co., Ltd., Osaka, Japan

[21] Appl. No.: 379,365

[22] Filed: May 18, 1982

Related U.S. Application Data

[63] Continuation of Ser. No. 149,744, May 14, 1980, abandoned

[30] Foreign Application Priority Data

May 18, 1979 [JP] Japan .................................. 54-61819
May 18, 1979 [JP] Japan .................................. 54-61818

[51] Int. Cl.³ .......................... G11B 15/60; G11B 5/08
[52] U.S. Cl. .................................. 360/130.24; 360/84
[58] Field of Search ...................... 360/130.24, 130.23, 360/84, 102–103, 107–108, 129

[56] References Cited

U.S. PATENT DOCUMENTS 3,363,065  1/1968  Tanigawa .................... 360/130.24 X
3,840,895  10/1974  Kubo ........................... 360/130.24 X
3,930,270  12/1975  Tanigawa ....................... 360/84 X
4,163,266  7/1979  Tamamura et al. ................. 360/84

Primary Examiner—John H. Wolff
Attorney, Agent, or Firm—Stevens, Davis, Miller & Mosher

[57] ABSTRACT

A tape guide device of a rotary head type video tape recorder of the helical scanning system including a shoulder portion formed on an outer circumferential surface of a lower stationary cylindrical portion cooperating with an upper rotary cylindrical portion and constituting a head cylindrical drum for guiding a magnetic tape. The shoulder portion has, in a section thereof with which the magnetic tape is not brought into contact, a configuration consisting of a plurality of parabolic lines connected to one another. Alternatively, the offset portion may have a configuration consisting of curves which are such that their second differential coordinates are continuous over the entire circumference of the head cylindrical drum with respect to the fixed coordinate system disposed on the outer circumferential surface of the head cylindrical drum, or the shoulder portion may have a configuration consisting of curves which are such that the absolute value of the maximum value of the second differential coefficients is not equal to the absolute value of the minimum value thereof.

10 Claims, 10 Drawing Figures 4,459,627

METHOD OF PRODUCING A TAPE GUIDE DEVICE OF A ROTARY HEAD TYPE VIDEO TAPE RECORDER AND THE PRODUCT THEREOF

This is a continuation of application Ser. No. 149,744 filed May 14, 1980.

BACKGROUND OF THE INVENTION

This invention relates to a tape guide device of a rotary head type video tape recorder for recording and reproducing video signals.

In a rotary head type video tape recorder (VTR) of the helical scanning system, the tape guide device comprises a head cylindrical drum including an upper rotary cylindrical portion and a lower stationary cylindrical portion constituting a stationary cylindrical drum, a shoulder portion formed in the outer circumferential surface of the stationary cylindrical drum and extending over the entire circumference of 360°, the shoulder portion having a guide section extending over a part of the entire circumference for guiding a magnetic tape in its travel around the stationary cylindrical drum and a non-guiding section extending over the remaining part of the entire circumference, and a plurality of guide pins each disposed on one of opposite sides of the head cylinder drum for guiding the magnetic tape to and from the head cylindrical drum. The magnetic tape helically contacts the outer circumferential surface of the head cylindrical drum for a circumferential extend on the order of 180° and travels at a predetermined speed while the lower edge of the tape is guided by the guide section which it is in contact. A magnetic head is attached to the upper rotary cylindrical portion and obliquely traverses the magnetic tape as the latter travels around the head cylindrical drum, to record or reproduce video signals on the magnetic tape.

In the prior art, the shoulder portion is formed so as to have a suitable configuration combining straight lines with arcs in the developed circumferential plan view. In the formation of the shoulder portion of the configuration described, difficulties have been experienced in operating the tool rest of a lathe in its machining process, and when operation of the tool rest is not performed properly, the precision with which the shoulder portion is formed is reduced and the circularity of the head cylindrical drum is impaired. The use of such a head cylindrical drum for guiding a magnetic tape results in distorted images reporduced by the VTR because the magnetic tape is not guided accurately.

SUMMARY OF THE INVENTION

This invention obviates the aforesaid disadvantages of the prior art. Accordingly, the invention provides a tape guide device of a rotary head type video tape recorder, including a stationary cylindrical drum having a shoulder portion formed in the outer circumferential surface thereof for regulating the position of travel of a magnetic tape in a guide section which is a part of the shoulder portion, and a novel method of construction of the tape guide device comprising a method of construction of the shoulder portion enabling easy manufacturing of the stationary cylindrical drum with a high degree of precision so that the rotary head type video tape recorder incorporating the stationary cylindrical drum thus produced perfectly reproduces signals on the magnetic tape.

The outstanding characteristic of the invention is that the shoulder portion is constructed so as to describe a curve in the combination of parabolas in its non-guiding section; so that the acceleration of a tool rest can be minimized when the shoulder portion is cut by a lathe in the machining process.

Additional and other objects, features and advantages of the invention will become more apparent from the description set forth hereinafter when considered in conjunction with the accompanying drawings.

BRIEF DESCRIPTION OF THE DRAWINGS

FIG. 5b is a view showing changes in the velocity and acceleration of the tool rest for cutting the shoulder portion of the configuration shown in FIG. 5a;

FIG. 6b is a view showing changes in the velocity and acceleration of the tool rest for cutting the shoulder portion of the configuration shown in FIG. 6a;

FIG. 7b is a view showing changes in the velocity and acceleration of the tool rest for cutting the shoulder portion of the configuration shown in FIG. 7a.

DESCRIPTION OF THE PREFERRED EMBODIMENTS

Figure 1:
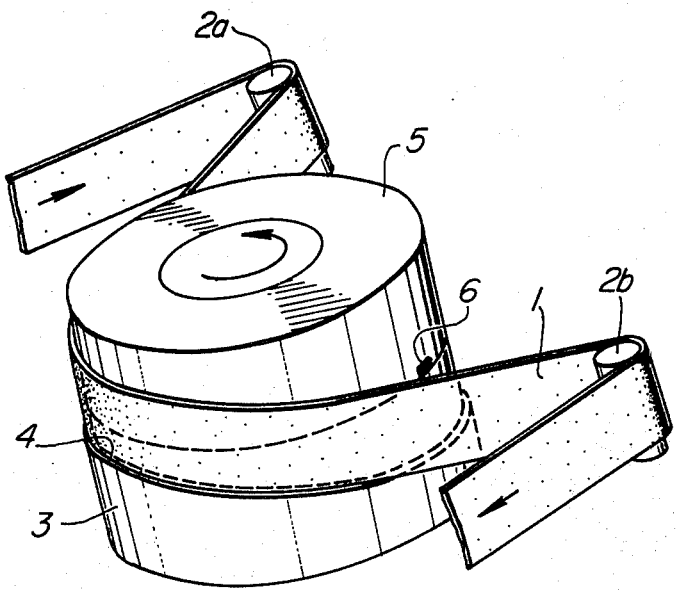
FIG. 1 is a perspective view of the tape guide device of a rotary head type VTR.

To enable the present invention to be clearly understood, a tape guide device of a rotary head type VTR of the helical scanning system will be described in some detail, and thereafter preferred embodiments of the invention will be described. FIG. 1 shows a magnetic tape 1 guided by a plurality of guide pins 2a and 2b and helically contacting an outer circumferential surface of a head cylindrical drum including an upper rotary cylindrical portion 5 and a lower stationary cylindrical portion 3 constituting a stationary cylindrical drum of the tape guide device. The magnetic tape travels a predetermined velocity around the head cylindrical drum for a circumferential extent on the order of 180° while a lower edge of the magnetic tape 1 is guided by a shoulder portion 4 formed on the outer circumferential surface of the lower stationary cylindrical portion 3. A magnetic head 6 is attached to the upper rotary cylindrical portion 5 and obliquely traverses the magnetic tape 1 to record or reproduce video signals.

In the tape guide device of the aforesaid construction, it is essential that the outer circumferential surfaces of the upper rotary cylindrical portion 5 and the lower stationary cylindrical portion 3 and the shoulder portion 4 formed on the lower stationary cylindrical portion 3 should be accurately fabricated and be correctly assembled. If this is not the case, the condition in which the magnetic head 6 contacts the magnetic tape 1 would become unstable and some irregularities would be encountered in the images reproduced by the VTR.

Figure 2:
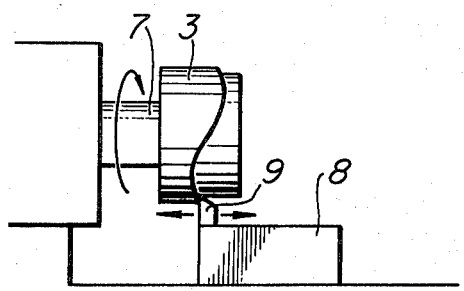
FIG. 2 is a view in explanation of the method for cutting the outer circumferential surface of the lower stationary cylindrical portion of the VTR in order to form a shoulder portion for guiding the magnetic tape.

FIG. 2 shows the manner in which the shoulder portion 4 is cut in the outer circumferential surface of the lower stationary cylindrical portion 3 by means of a lathe. More specifically, the lower stationary cylindrical portion 3 is secured to a main spindle 7 and rotated at a predetermined velocity, and a cutting tool 9 secured to a tool rest 8 moves, to shape the shoulder portion 4, in reciprocatory movement in the directions of arrows (in the directions of the axis of the main spindle 7) illustrated in the figure relative to the lower stationary cylindrical portion 3 in synchronism with the rotation of the main spindle 7. Thus, the position of the tool rest 8 during its reciprocatory movement should match the configuration of the shoulder portion 4.

Figure 3:
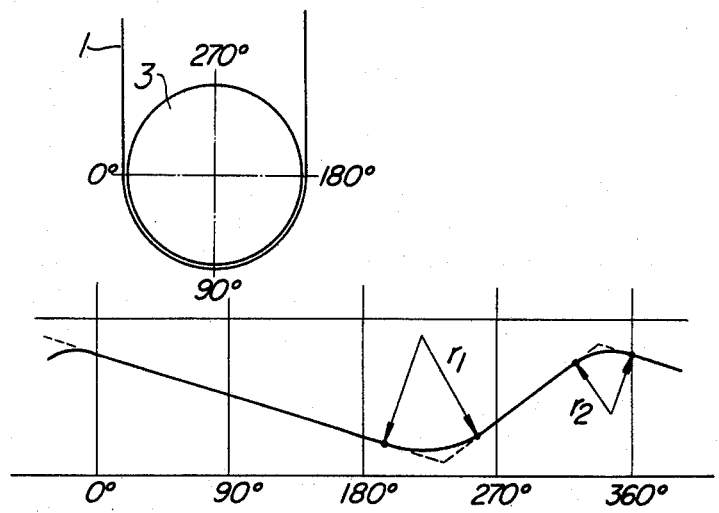
FIG. 3 is a developed view showing the configuration of the shoulder portion of the prior art.

FIG. 3 shows in a developed view the configuration of the shoulder portion of the prior art cut on the outer circumferential surface of the lower stationary cylindrical portion. The magnetic tape 1 travels around the lower stationary cylindrical portion 3 for a circumferential extent on the order of 180°, and the guide section of the shoulder portion with which the tape 1 is in contact is linear in configuration. The remaining part of the shoulder portion 4, which substantially extends from 180° to 360° and; has nothing to do with the travel of the tape 1 has a configuration consisting of straight lines and arcs in combination. This remaining part will be hereinafter referred to as "non-guiding section".

Figure 4:
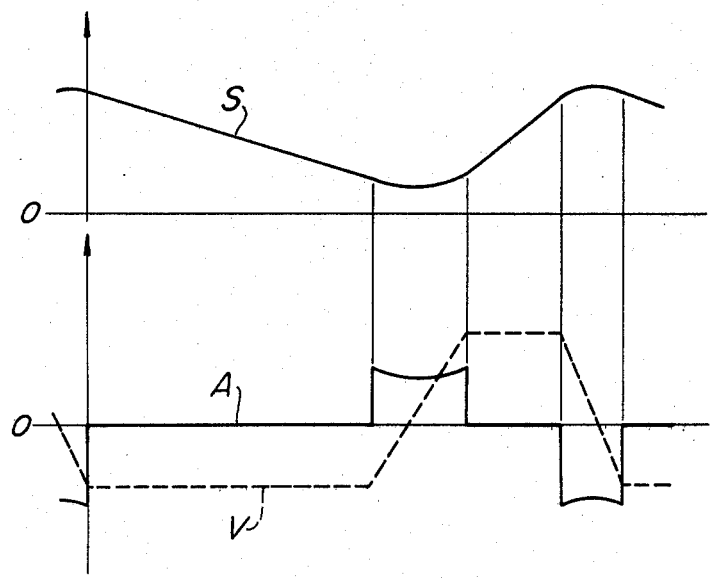
FIG. 4 is a view showing the shiftings of a tool rest for cutting the shoulder portion of the prior art.

FIG. 4 shows shiftings, velocities and accelerations of the tool rest 8 which should occur during its movement for shaping the shoulder portion 4 of the aforesaid configuration by means of a lathe. In the FIG. 4, S, V and A designate shiftings, velocities and accelerations of the tool rest 8 respectively. The acceleration A is zero (0) in shaping the linear sections of the shoulder portion 4, but it is necessary to impart a considerably high degree of acceleration to the tool rest 8 in shaping arcuate sections of the shoulder portion 4. This would result in an unduly large force being exerted on the tool rest 8 and might cause vibration which would adversely affect the operation of the machine tool. The result would be that the precision with which the shoulder portion should be cut is reduced and the circularity of the head cylindrical drum is impaired. The use of the tape guide device including the thus formed head cylindrical drum could not guide a tape correctly and would cause irregularities in the images reproduced by the VTR.

Figure 5A:
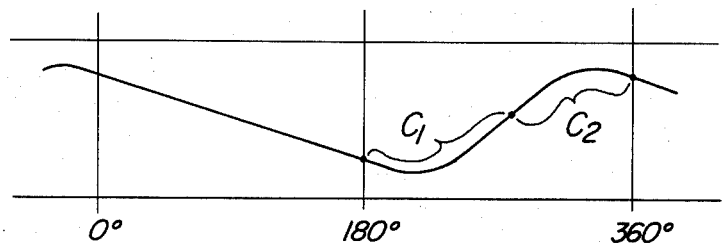
FIG. 5a is a developed view showing the configuration of the shoulder portion comprising one embodiment of the invention.
Figure 5B:
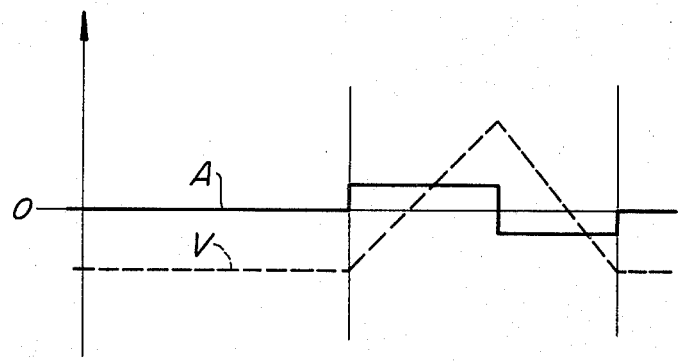

Preferred embodiments of the invention free from the aforesaid disadvantages of the prior art will now be described. In the embodiment shown in FIG. 5a illustrating a developed circumferential plan view of the outer circumferential surface of a stationary cylindrical drum, a guide section of the shoulder portion 4 extending for a circumferential extent of 180° with which the magnetic tape 1 is brought into contact is linear, and the non-guiding section of the shoulder portion 4 extending for the remaining circumferential extent from 180° to 360° with which the tape 1 is not brought into contact consists of a concave parabolic portion C1 and a convex parabolic portion C2. FIG. 5b shows changes in the velocity V and acceleration A of the tool rest 8 which occur when the shoulder portion 4 of the configuration shown in FIG. 5a is shaped. In the FIG. 5b, it will be seen that the accelerations are greatly reduced in value in comparison with the accelerations of the tool rest 8 represented by the acceleration curve shown in FIG. 4 obtained in shaping the shoulder portion 4 of the prior art since the non-guiding section having the above-mentioned configuration has a relatively small absolute value of the second differential coefficient with respect to the circumferential angular position, which is directly proportional to the acceleration of the tool rest having the spindle rotated at a constant rotational speed.

When the energy of the movement of the tool rest 8 is taken into consideration, this phenomenon could be explained by the following:

(1) The value obtained by integrating the accelerations should be zero (0).

(2) The value obtained by integrating the absolute values of the accelerations should be constant.

When the shoulder portion formed in the outer circumferential surface of the lower stationary cylindrical portion of the head cylindrical drum of the tape guide device is of the aforesaid constructional form according to the invention, the accelerations of the tool rest 8 can be minimized in forming the shoulder portion 4 by means of a lathe so that the tool rest 8 can readily follow up the movement of the lower cylindrical portion supported by the main spindle and undesirable vibration of the machine tool can be minimized. Thus circularity of the head cylindrical drum can be improved and the precision with which the shoulder portion is shaped can be increased. The tape guide device provided with such a head cylindrical drum is capable of guiding a magnetic tape with increased precision, thereby eliminating irregularities in the images reproduced by the VTR.

When the tool rest 8 is moved in reciprocatory movement by means of a cam mechanism as is usual with the case, the invention is effective in reducing wear that might be caused on the cam surface.

Figure 6A:
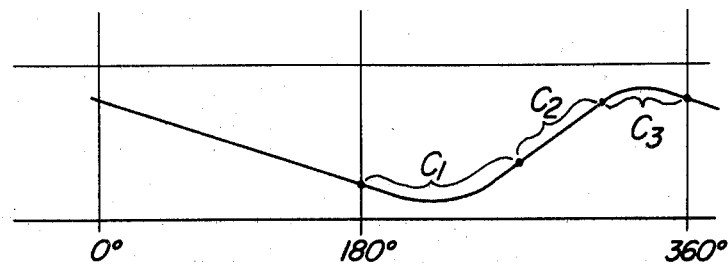
FIG. 6a is a developed view showing the configuration of the shoulder portion comprising another embodiment of the invention.
Figure 6B:
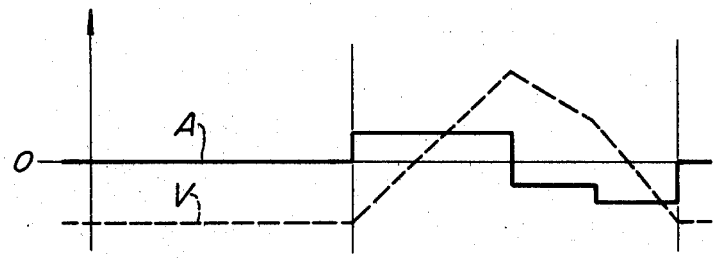

In the embodiment shown in FIG. 5a, the non-guiding section of the shoulder portion 4 which is not brought into contact with the magnetic tape 1 is a curve consisting of two parabolic lines contiguous with each other. It is to be understood that the shoulder portion 4 may be a curve consisting of three parabolic lines connected to one another, as shown in FIG. 6a, to eliminate abrupt changes in acceleration of the tool rest as shown in FIG. 6b.

Figure 7A:
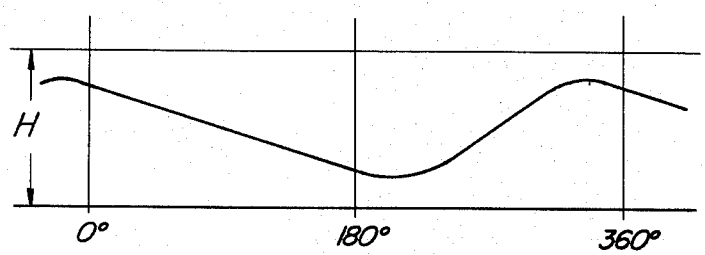
FIG. 7a is a developed view showing the configuration of the shoulder portion comprising still another embodiment of the invention.
Figure 7B:
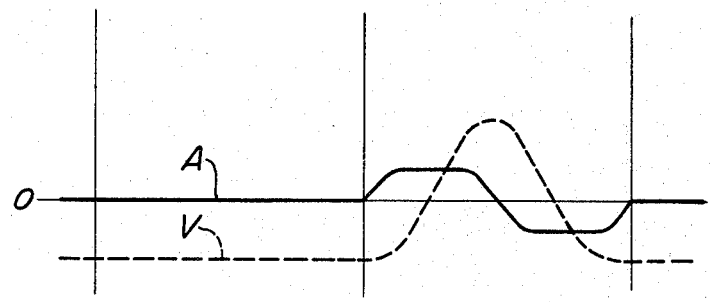

FIGS. 7a and 7b show still another embodiment of the invention in which the shoulder portion 4 has a configuration such that the acceleration curve is continuous in shaping the non-guiding section of the shoulder portion. That is, the shoulder portion formed on the outer circumferential surface of the head cylindrical drum has a configuration consisting of curves which are such that their second differential coefficients are continuous over the entire circumferential extent of the drum with respect to the fixed coordinate system located on the outer circumferential surface of the drum.

The shoulder portion 4 shown in FIG. 7a is shaped with the use of a cam having a modified trapezoidal curve (a term expressing a cam curve) so that acceleration changes continuously, in a section thereof extending for a circumferential extent of 180° other than a linear section thereof in which the magnetic tape 1 is engaged (the non-guiding section). FIG. 7b shows changes in velocity V and acceleration A occurring when the shoulder portion 4 of the configuration shown in FIG. 7a is shaped. In comparison with the acceleration curve (see FIG. 4) obtained when the shoulder portion 4 of the prior art is shaped, the acceleration curve obtained in the invention offers the following advantages:

(1) Acceleration shows changes continuously, so that adverse effects upon to the machine tool can be prevented.

(2) The acceleration sections and the deceleration sections are increased and the absolute value of acceleration is smaller in the embodiment shown in FIG. 7b than in the prior art shown in FIG. 4, so that the cutting tool and the tool rest can readily follow up the movement of the lower cylindrical portion supported by the main spindle.

Thus the circularity of the head cylindrical drum can be improved and the precision with which the shoulder portion is produced can be increased by adopting the constructional form of the invention shown in FIGS. 7a and 7b. The magnetic tape is guided with increased accuracy by the shoulder portion and irregularities in the images reproduced by the VTR can be minimized.

In the constructional form of the invention shown in FIG. 7a, the shoulder portion 4 is in the form of a modified trapezoidal curve. It is to be understood, however, that the invention is not limited to this specific form of the shoulder portion 4 and that any other curve, such as a cycloidal curve, composite sine curve, modified sine curve, parabolic sine curve, etc., in which acceleration shows changes continuously may be used with the same effect.

Also, in FIG. 7a, the shoulder portion 4 should be positioned quite near the upper end of the lower stationary cylindrical portion having a height H in the vicinity of 0° of the circumferential extent of the lower stationary cylindrical portion, in the case of the magnetic head scanning system. To meet this requirement, it may be enough to use a non-symmetrical modified trapezoidal curve in which the absolute value of the maximum second differential coefficient is not equal to the absolute value of the minimum second differential coefficient, or a trapecloid curve or other nonsymmetrical curve.

What is claimed is:

1. A method of producing a tape guide device of a rotary head type video tape recorder, having
    a head cylindrical drum including
        an upper rotary cylindrical portion and a lower cylindrical portion constituting a stationary cylindrical drum having an outer circumferential surface;
    a plurality of guide pins each disposed on opposite sides of the head cylindrical drum for guiding the magnetic tape to and from the head cylindrical drum;
    said method comprising using a cutting device to form a shoulder portion in said outer circumferential surface, said shoulder portion being formed over the entire circumference of 360° of said stationary cylindrical drum and having a guide section for guiding a magnetic tape in its travel around the head cylindrical drum and a non-guiding section which said tape does not contact, and
    guiding said cutting device so as to form a surface configuration of said non-guiding section consisting of a plurality of parabolic curved surfaces connected to one another.

2. A method according to claim 4, wherein said cutting device is a lathe, and said stationary cylindrical drum is rotated past and in contact with a cutting blade of said lathe while reciprocating said blade in an axial direction parallel to axis of rotation of said drum.

3. A method according to claim 2, wherein the said cutting blade moves in a reciprocating fashion with a constant velocity while forming said guide section, and the accelerations of said cutting blade are minimized while forming said non-guiding section.

4. A method according to claim 3, wherein the value obtained by integrating the accelerations of said cutting blade is zero and the value obtained by integrating the absolute values of said accelerations is constant.

5. A method of producing a tape guide device of a rotary head type video tape recorder, having
    a head cylindrical drum including
        an upper rotary cylindrical portion and a lower cylindrical portion constituting a stationary clyindrical drum having an outer circumferential surface;
    a plurality of guide pins each disposed on opposite sides of the head cylindrical drum for guiding the magnetic tape to and from the head cylindrical drum;
    said method comprising using a cutting device to form a shoulder portion in said outer circumferential surface, said shoulder portion being formed over the entire circumference of 360° of said stationary cylindrical drum and having a guide section for guiding a magnetic tape in its travel around the head cylindrical drum and a non-guiding section which said tape does not contact, and
    guiding said cutting device so as to form a surface configuration of said non-guiding section consisting of a curve having second differential coefficients with respect to circumferential angular positions of said stationary cylindrical drum, which are continuous over the entire circumference of the stationary cylindrical drum when considering a fixed coordinate system located on the outer circumferential surface of the stationary cylindrical drum.

6. A method according to claim 5, wherein the absolute value of a maximum value of said second differential coefficients is not equal to the absolute value of a minimum value thereof.

7. A method according to claim 1 or 5, wherein said shoulder portion is formed near an upper end of said stationary cylinder.

8. In a tape guide device of a rotary head type video tape recorder, comprising
    a head cylindrical drum including
        an upper rotary cylindrical portion and a lower stationary cylindrical portion constituting a stationary cylindrical drum having an outer circumferential surface;
    a shoulder portion formed in said outer circumferential surface and having a guide section for guiding a magnetic tape in its travel around the head cylindrical drum and a non-guiding section which does not contact said tape, said shoulder portion being shaped using a lathe so as to extend over the entire circumference of 360° of said stationary cylindrical drum; and
    a plurality of guide pins each disposed on opposite sides of the head cylindrical drum for guiding the magnetic tape to and from the head cylindrical drum;
    the improvement wherein said non-guiding section has a surface configuration consisting of a plurality of parabolic curved surfaces connected to one another.

9. In a tape guide device of a rotary head type video tape recorder, comprising:
a head cylindrical drum including
an upper rotary cylindrical portion and a lower stationary cylindrical portion constituting a stationary cylindrical drum having an outer circumferential surface;
a shoulder portion formed in said outer circumferential surface and having a guide section for guiding a magnetic tape in its travel around the head cylindrical drum and a non-guiding section which does not contact said tape, said shoulder portion being shaped using a lathe so as to extend over the entire circumference of 360° of said stationary cylindrical drum; and
a plurality of guide pins each disposed on opposite sides of the head cylindrical drum for guiding the magnetic tape to and from the head cylindrical drum;
the improvement wherein said shoulder portion has a configuration of a curve having second differential coefficients with respect to circumferential angular positions of said stationary cylindrical drum, which are continuous over the entire circumference of the stationary cylindrical drum when considering a fixed coordinate system located on the outer circumferential surface of the stationary cylindrical drum.

10. A tape guide device of a rotary head type video tape recorder as claimed in claim 9, wherein the absolute value of a maximum value of said second differential coefficients is not equal to the absolute value of a minimum value thereof.

* * * * *